Figure 1:
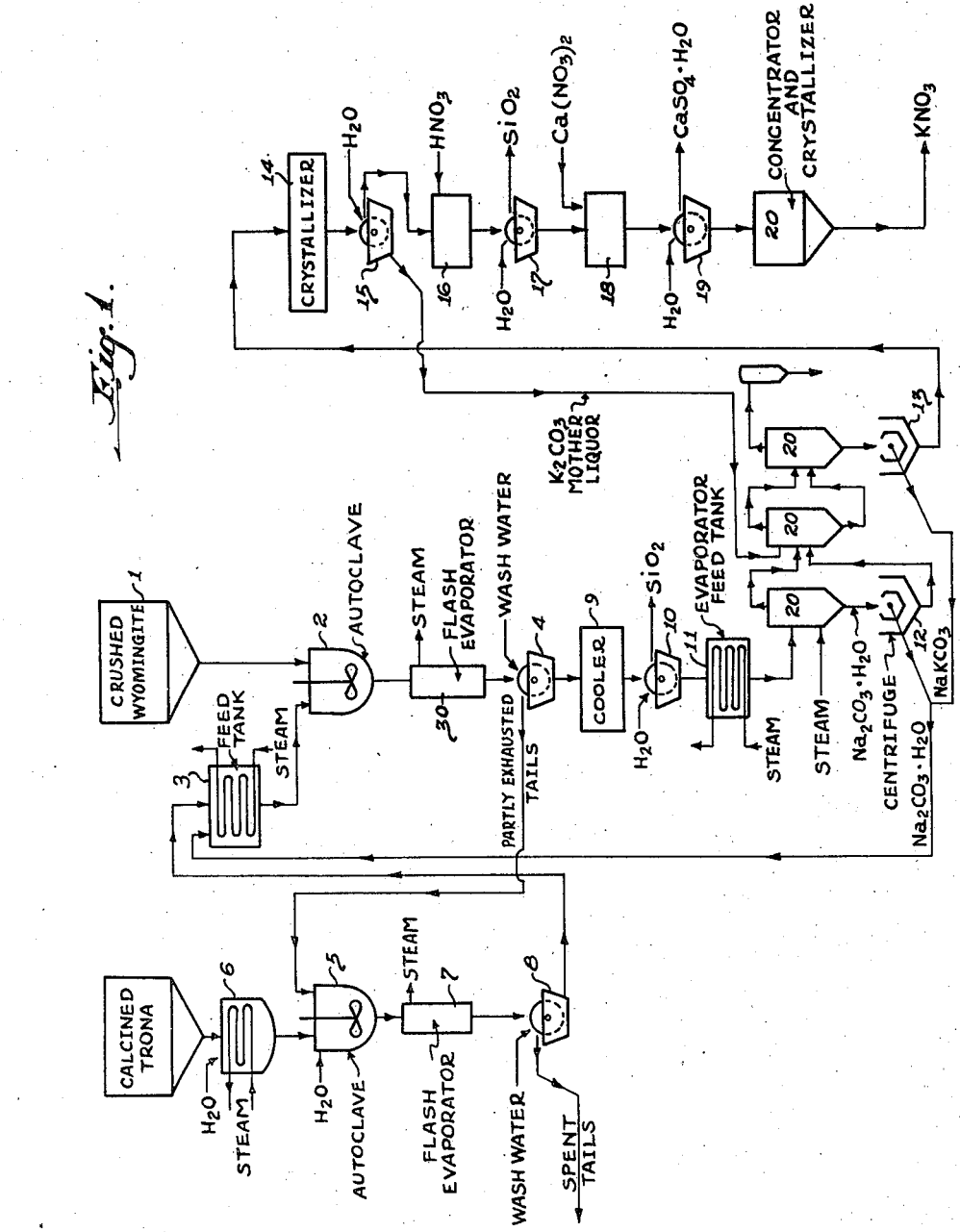

INVENTOR.
ROBERT D. PIKE.

Patented Nov. 30, 1948

2,455,190

UNITED STATES PATENT OFFICE 2,455,190

EXTRACTING POTASH FROM WYOMINGITE

Robert D. Pike, Pittsburgh, Pa.

Application August 2, 1944, Serial No. 547,699

11 Claims. (Cl. 23—33)

This invention relates to the production of potassium salts from leucitic rocks.

Wyomingite, which occurs in the State of Wyoming, is a rock approximately half of which consists of the mineral leucite ($K_2O.Al_2O_3.4SiO_2$). Due to the base exchange properties of leucite 100 pounds of Wyomingite contain about 8 pounds of available potash as $K_2O$. Because the present invention is applicable particularly to the treatment of Wyomingite for the production of potassium salts it will be described with particular reference thereto, by way of illustration and for ease of description.

In my Patents Nos. 2,343,080 and 2,343,081, granted February 29, 1944, I have disclosed and claimed processes for the recovery of potassium carbonate ($K_2CO_3$) from Wyomingite by base exchange with sodium carbonate ($Na_2CO_3$). Briefly, in accordance with those inventions Wyomingite is autoclaved with a solution of sodium carbonate, suitably provided by calcining trona ($Na_2CO_3.NaHCO_3.2H_2O$), large deposits of which are available in the vicinity of the main Wyomingite beds, to convert its bicarbonate content to the normal carbonate, and dissolving the calcine in water. After treatment for, say, 3 to 4 hours under a steam pressure of about 200 to 250 pounds per sq. inch the base exchange reaction is substantially completed. The resultant solution, containing sodium and potassium carbonates, is separated from the tails and is evaporated to crystallize out sodium carbonate as the monohydrate ($Na_2CO_3.H_2O$). This is continued up to the point where the solution becomes saturated with the double salt, sodium potassium carbonate ($NaKCO_3$), and after crystallization of the double salt the mother liquor is cooled to crystallize out potassium carbonate as the sesquihydrate ($K_2CO_3.3/2H_2O$). In the practice of those processes the sodium carbonate and potassium carbonate are recovered separately for desired use or sale while the double salt and the mother liquor from the potassium carbonate crystallization are returned to the system. Further details of the processes of those two patents will appear from the patents themselves.

It is characteristic of the procedures of the aforementioned patents that to effect satisfactory potash extraction a considerable excess of sodium carbonate is necessary. Thus, in the solution recovered from the autoclave the weight ratio of $Na_2CO_3:K_2CO_3$ should be not less than about 1.8:1, and it may be as high as 3.5:1. In other words, for the complete removal of the available potash from leucitic rock in accordance with the procedures of my above-identified patents the sodium carbonate must be present in such quantity that its ratio in the solution produced by the base exchange reaction must be not less than the minimum just specified.

A primary object of the present invention is to provide a method for extracting substantially all of the available potash from Wyomingite and kindred leucitic rocks by the use of substantially the theoretically equivalent amount of a sodium salt such, for example, as sodium carbonate.

Another object is to produce from Wyomingite potassium salts adapted to use as fertilizers.

Although in the practice of the processes provided by the patents identified above potassium carbonate can be produced without producing sodium carbonate as an end material, by recirculating the sodium carbonate produced, a very large circulation of sodium carbonate in relation to potassium carbonate is necessary. A further object of the present invention is to provide a modified mode of practicing the foregoing patented processes in which the amount of sodium carbonate that has to be recirculated, when sodium carbonate is not to be produced as an end material, is reduced by approximately 80 to 90 per cent whereby the circulating sodium carbonate is small in amount relative to the potassium carbonate produced.

Yet another object is to provide a method of treating such extracts to remove silica and thus provide potassium salts of high purity.

A still further object is to provide a method of the type referred to in which Wyomingite is treated to extract its available potash substantially completely to provide a solution in which the weight ratio of sodium carbonate to potassium carbonate is approximately 0.51 to 1, whereby to gain advantage over similar solutions in which the ratio is at least 1.8 to 1, and more particularly to accomplish this by partially extracting the potash from Wyomingite by autoclave treatment to effect base exchange with sodium ion, using for this purpose the liquor derived from extraction of the partially exhausted tails from the foregoing step with a sodium carbonate solution containing substantially the amount of sodium carbonate required for complete extraction of the available potash in the fresh Wyomingite.

Figure 2:
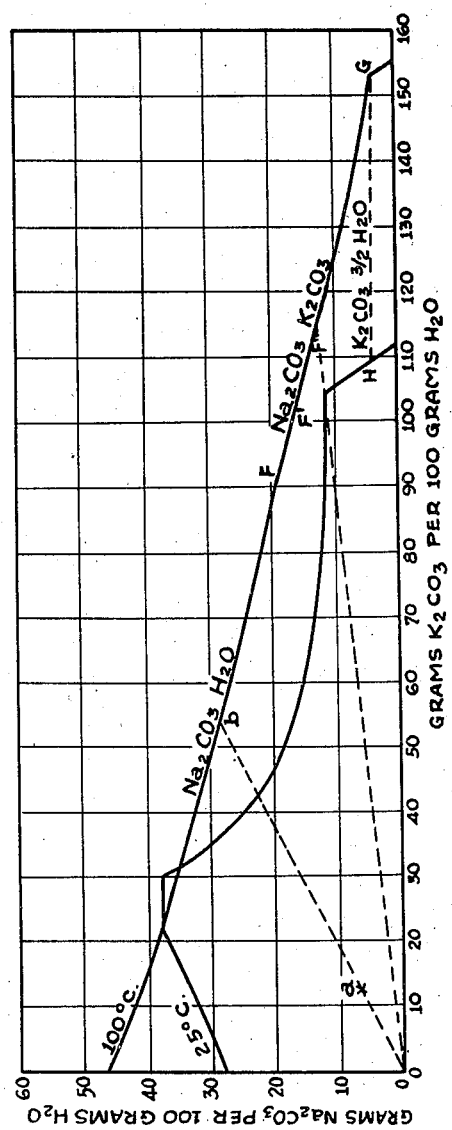

The invention may be described with reference to the accompanying drawings in which Fig. 1 is a flow sheet illustrating the preferred embodiment of the invention; Fig. 2 a solubility diagram of the usual type for the system sodium carbonate-potassium carbonate-water, showing the solubility relationships at 25° C. and 100° C.; and Fig. 3 a diagram showing the relation of the extraction of potash from Wyomingite to the weight ratio of sodium carbonate to potassium carbonate after treatment for 3 to 4 hours at 200 to 250 pounds per sq. inch steam pressure. In Fig. 2 the data for the 25° C. isotherm are taken from the work by Hill and Miller, Jour. Amer. Chem. Soc. 49, 669–686, and the data for the 100° isotherm were developed in the course of my investigations, while the line $a$—$b$ is a derived position used hereinafter in describing the process of the present invention.

I have discovered, and it is upon this that the invention is in large part predicated, that substantially complete extraction of the available potash of Wyomingite and kindred leucitic rocks using substantially the theoretically equivalent amount of sodium carbonate needed for the base exchange reaction and with production of a solution in which the weight ratio $Na_2CO_3:K_2CO_3$ is of the order of 0.51:1 can be accomplished readily by stepwise, or cyclic, application of the base exchange reaction. In other words, although the single autoclave operation described in my above-identified patents requires the use of a weight ratio of $Na_2CO_3:K_2CO_3$ of at least 1.8:1 in the end liquor, I have now discovered that equivalent extraction can be had with approximately the theoretical amount of sodium carbonate by effecting the autoclaving in a series of steps involving recycling movement of the leaching solution.

More in detail, in accordance with the present invention fresh Wyomingite is treated in an autoclave to effect extraction of a substantial proportion of its available potash, using for this purpose the solution derived from a subsequent autoclave treatment. The partly exhausted tails from this first autoclave are then treated separately with an aqueous solution of sodium carbonate containing substantially the amount of sodium carbonate equivalent to the available potash of the fresh Wyomingite treated in the first autoclave. This second autoclave step completes the extraction of the available potash with production of exhausted tails and a solution whose $Na_2CO_3:K_2CO_3$ ratio is approximately 2:1. The solution from this second autoclave step is then passed to the first autoclave and thus furnishes the solution which is used for the partial, first autoclave extraction. The solution obtained from the first autoclave step may be, and preferably is, then treated as described in my aforesaid patents to crystalize out sodium carbonate, usually as the monohydrate, and then the double salt, after which the resultant mother liquor is cooled to crystallize out and recover potassium carbonate. The mother liquor from the potassium carbonate crystallization is returned to the system, preferably in the manner presently to be described, and the double salt, preferably together with the recovered sodium carbonate, is cycled to the solution from the second autoclave step which constitutes the extraction medium used with fresh Wyomingite in the first autoclave step.

Instead of recovering potassium carbonate, the $K_2CO_3.3/2H_2O$ or the solution remaining after crystallizing the double salt may be treated to produce, by reaction, fertilizer compounds, as by treating the solution with nitric acid, phosphoric acid, or sulfuric acid, to produce, respectively, the nitrate, the phophate, or the sulfate, all of which are valuable fertilizing materials. I find that by such acid treatment any residual silica is precipitated from the solution in a form which makes it a valuable by-product. Such compounds may, if desired, be produced also by the use of appropriate sodium salts for extraction of the Wyomingite because the anion associated with the sodium ion that undergoes base exchange with the potassium of the leucitic rock is immaterial so far as the base exchange reaction is concerned. Thus, to produce potassium nitrate the autoclave charge would contain sodium nitrate, etc. However, in such cases the problem of separating the sodium and potassium salts from the final autoclave solution is entirely different from that encountered when sodium carbonate is used, and for most purposes I find it preferable to use the carbonate system, particularly because I can readily separate the sodium and potassium salts, the carbonates find ready markets, and it is economically better to prepare potassium carbonate and thereafter to convert it to other desired salts. Moreover, these carbonate solutions not only are not corrosive to ordinary materials of construction, but actually they exhibit a corrosion inhibiting action upon ferrous materials so that they are preferable to the nitrates or phosphates.

The invention may be described in greater detail with reference to the accompanying drawings. In referring to Fig. 1 in the following description the amounts stated are with relation to the production of one ton of $K_2CO_3$, due allowance being made for reasonable variations in these quantities such as are encountered in normal manufacturing operations.

Having reference now to Fig. 1, about 8.5 tons of Wyomingite is passed from a storage bin 1 to an autoclave 2 where it is treated with a solution, described in detail hereinafter, from a feed tank 3. The Wyomingite passed to the autoclave is preferably ground to pass a 10-mesh screen, but it may be coarser or finer than that size. Fairly large lumps react quite completely, given time, but finer sizes react much more rapidly. The treatment in autoclave 2 may be under the conditions described in my above-identified patents, namely, 3 to 4 hours at 200 to 250 pounds per sq. inch steam pressure. This results in the extraction of about 5.8 pounds of $K_2O$ per 100 pounds of fresh Wyomingite fed to the autoclave, and approximately 2.2 pounds of $K_2O$ per 100 pounds remain available in the tails for extraction. The contents of autoclave 2 are discharged to a flash evaporator 30 and then pass to a filter 4 where the partly exhausted tails are washed.

The washed partly exhausted tails from filter 4 then pass to a second autoclave 5 where they are mixed with 0.766 ton of $Na_2CO_3$, which is the amount theoretically needed to produce 1 ton of $K_2CO_3$, i. e., the available potash in the fresh Wyomingite charged to autoclave 2. This amount of sodium carbonate is preferably dissolved in about 3.7 tons of water in a dissolving tank 6 from which the solution passes to autoclave 5. After autoclaving, suitably under the conditions described above, the contents of autoclave 5 pass to a flash evaporator 7 and thence to a filter 8. The filter cake, consisting of exhausted tails, goes to waste, while the filtrate together with the water used for washing the tails, amounting to about 10.5 tons, passes to feed tank 3 for making up the solution used in the first autoclave step. There are also added to feed tank 3 about 0.41 ton of sodium carbonate recycled as the monohydrate, or equivalent $Na_2CO_3$, and about 0.64 ton of recycled double salt.

The net result of this two-stage recycling autoclave operation is to remove substantially all of the exchangeable $K_2O$ from the Wyomingite with the use of only the theoretically equivalent amount of sodium carbonate, producing washed exhausted tails and a solution containing about 11.25 tons of water, 1.39 tons of potassium carbonate, and 0.71 ton of sodium carbonate, i.e., a solution in which the ratio of sodium carbonate to potassium carbonate is about 0.51. In this solution the 1.39 tons of potassium carbonate is made up of the 1 ton extracted from the Wyomingite plus 0.39 ton recycled as the double salt. The 0.71 ton of sodium carbonate consists of 0.41 ton recycled as the monohydrate, and 0.30 ton recycled as the double salt.

Returning now to the treatment of the final solution from the first autoclave, the filtrate and wash water from filter 4 pass to a cooling tank 9. The concentration of the solution entering this tank is about 12.35 grams of potassium carbonate and 6.3 grams of sodium carbonate per 100 grams of water. Although this cooling step is not essential, it is preferable to cool the liquor, say to about 25° C, because this results in precipitation of most of the silica taken into solution in the autoclaves 2 and 5. The silica thus precipitated is removed by a filter 10, and the filtrate and wash water are passed to an evaporator feed tank 11 where the solution is preferably heated with steam before being introduced to the triple effect evaporators 20. Tanks 3 and 6 are also preferably provided with steam coils for heating their contents.

The concentration of the evaporator feed is, as appears from the foregoing data, approximately at the point $a$ of Fig. 2, which shows the course of evaporation. Along the line $a$—$b$ simple evaporation takes place with evaporation of about 8.8 tons of water per ton of $K_2CO_3$. At point $b$ sodium carbonate begins to be crystallized out as the monohydrate. If it is desired to recover the sodium carbonate, it may be separated from the mother liquor in a centrifuge 12, the mother liquor being passed to the next evaporation effect.

In order to use the flow sheet to produce a refined soda ash as a by-product, I may dissolve in the solution at "$a$" as much crude soda ash, for example, calcined Green River trona or salsoda made from the Green River brine, as it will take up to full saturation. The simple evaporation along line $a$—$b$ is thus eliminated and sodium carbonate monohydrate is crystallized out while the water is being evaporated. In this way at little additional expense, I may employ my process to produce any desired amount of sodium carbonate up to about 4.33 tons $Na_2CO_3$ per ton $K_2CO_3$.

The water to be evaporated while crystals are being made down to the point G amounts to about 1.32 ton per ton of $K_2CO_3$. At about the point F the mother liquor and wash water from the potassium carbonate crystals (recovered at a later stage) are returned to the evaporator circuit, as shown in Fig. 1, giving the point F'. Evaporation takes place along the line OF'F" and the double salt begins to crystallize at F" and is removed by a centrifuge 13. The mother liquor from the double salt is then cooled to crystallize potassium carbonate as the sesquihydrate, which occurs along line GH.

In the production of potassium salts other than the carbonate, the mother liquor from centrifuge 13 is passed to a cooler 14 in which the potassium carbonate sesquihydrate is crystallized out and is recovered and washed on a filter 15 with the resultant mother liquor and wash water being returned to the evaporator circuit as described above. The salt is then passed to a tank 16 where it is treated with the acid whose salt is desired, for example, nitric acid. Any silica which is present in the carbonate is thereby deposited as gelatinous silica which is in a free filtering form and may be used for the preparation of silica gel. The silica is removed on a filter 17 and the filtrate is passed to a tank 18 where it is treated with just sufficient calcium salt, the nitrate in this instance, to precipitate any sulfate that is present. The resultant calcium sulfate is removed by a filter 19, and the filtrate is then passed to a concentrator and crystallizer 20, the end product of which is substantially pure potassium nitrate.

It may be noted from Fig. 2 that the concentration of $Na_2CO_3$ at point G is very small as compared with that of $K_2CO_3$. If potassium nitrate is to be made for fertilizer use, there will often be no objection to the presence of a relatively small amount of sodium nitrate in the finished product. In such cases I may eliminate the crystallizer 14 and filter 15 and neutralize the entire end liquor from G in the tank 16. This will eliminate the recycling of the mother liquor from the crystals of potassium carbonate, but except that a little $NaNO_3$ is taken out with the potassium nitrate, has no other effect upon the overall relations of the process except to simplify its operation in a desirable manner.

Figure 3:
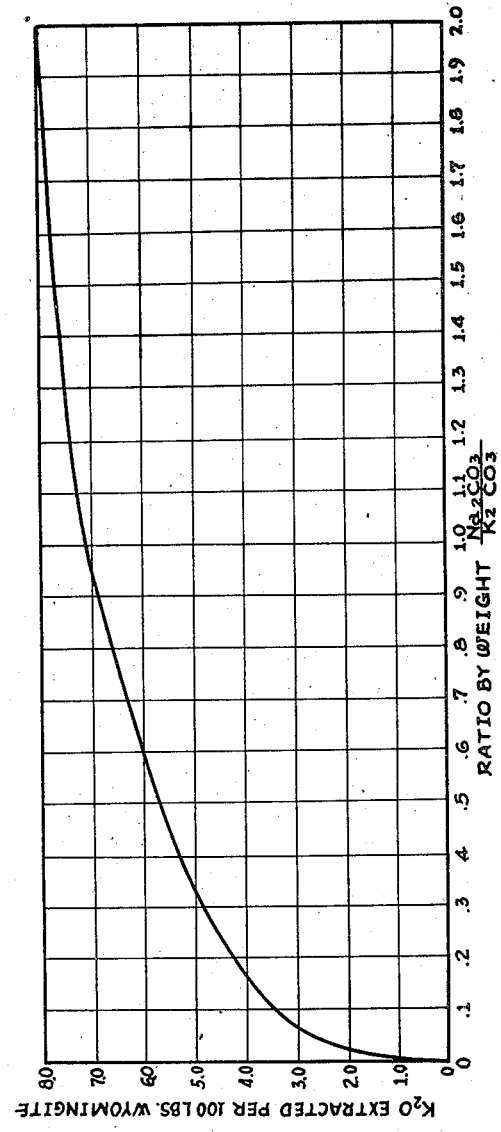

This efficiency of multi-stage recycling extraction is made possible by the relationship shown in Fig. 3. That is, the graph shows that complete extraction of the potash in a single autoclave step requires a large surplus of sodium carbonate. The sharp curvature of the graph makes it possible, on the other hand, to extract about 6 pounds of potash per 100 pounds of Wyomingite with substantially the theoretically equivalent amount of sodium carbonate, and the remainder may then be extracted in a second autoclave operation with production, as described above, of a final solution in which the ratio of sodium carbonate to potassium carbonate is about 0.51:1.

By using two autoclaves in recycling series I am thus able to strip the Wyomingite of its exchangeable potash using substantially the theoretically equivalent amount of sodium carbonate, or other sodium salt. If a high yield of potash is not considered to be essential, a single extraction may be applied using the data represented by Fig. 3 which shows, for example, that about 6 pounds of $K_2O$ per 100 pounds of Wyomingite may be recovered using only the amount of sodium carbonate theoretically equivalent to the potash extracted. More than two stages of autoclaving may be used, but inasmuch as two extractions as described suffice it is neither necessary nor desirable to use more.

Although the sodium carbonate monohydrate may be recovered as described above, I now prefer to return it, together with the double salt from centrifuge 13 to the feed tank 3 for the first autoclave. In ordinary operation of the preferred embodiment, therefore, tank 3 will receive, per ton of $K_2CO_3$ recovered, about 0.41 ton of sodium carbonate recycled as the monohydrate, and about 0.64 ton of recycled sodium potassium carbonate. If however, the sodium carbonate monohydrate is not returned to the system from centrifuge 12 an equivalent amount, for instance in the form of calcined trona, will be introduced into tank 3.

A suitable source of the sodium carbonate used in the practice of the invention is, as indicated, calcined trona, and large beds of almost pure trone occur in the Green River region of Wyoming close to the principal Wyomingite deposit in Zirkel Mesa, near Superior, Wyoming. That trona carries a small amount of chloride. Although the amount of chloride thus introduced into the potassium carbonate will be much less than results from practicing the methods of my above-identified patents, it may be desirable for some purposes to remove it. This may be accomplished by the method disclosed and claimed in my copending application Serial No. 527,607, filed March 22, 1944, now Patent No. 2,448,191, dated August 31, 1948. In accordance therewith the potassium sesquicarbonate produced as described above is redissolved, suitably in cold water to avoid solution of silica, the solution is filtered and the filtrate is evaporated to crystallize out potassium carbonate sesquihydrate, leaving the chloride in the mother liquor. Sodium carbonate is now dissolved in the chloride mother liquor, preferably in an amount such that the double carbonate will remain substantially in supersaturation when the brine is cooled, say to 25° C. The brine is then cooled whereupon about half of its content of potassium chloride is crystallized out and may be recovered for sale or use. The mother liquor is then returned to any appropriate point in the system.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. That method of extracting potash from Wyomingite comprising treating only all of the fresh Wyomingite in a first autoclave under steam pressure with solution from a second autoclave, separating partly exhausted tails from the solution from said first autoclave, treating said tails in said second autoclave with that amount of fresh sodium carbonate substantially theoretically equivalent to potash in the fresh Wyomingite treated in said first autoclave, separating exhausted tails from the solution from said second autoclave and passing the solution to the first autoclave, crystallizing and separating from the solution from said first autoclave sodium carbonate and then sodium potassium carbonate, and producing a mother liquor containing potassium carbonate.

2. That method of extracting potash from Wyomingite comprising treating only all of the fresh Wyomingite in a first autoclave under steam pressure with solution from a second autoclave to produce a solution in which the weight ratio of $Na_2CO_3$ to $K_2CO_3$ is about 0.51 to 1, separating partly exhausted tails from the solution from said first autoclave, treating said tails in said second autoclave with that amount of fresh sodium carbonate substantially theoretically equivalent to the $K_2O$ in the fresh Wyomingite treated in said first autoclave, separating the exhausted tails from the solution from said second autoclave and passing the solution to said first autoclave, evaporating the solution from said first autoclave to crystallize sodium carbonate and then sodium potassium carbonate, returning the crystallized sodium carbonate and sodium potassium carbonate to said first autoclave, and thereby producing a final solution containing the extracted potassium carbonate.

3. That method of extracting potash from Wyomingite comprising treating only all of the fresh Wyomingite in a first autoclave under steam pressure with solution from a second autoclave, separating the partly exhausted tails from the solution from said first autoclave, treating said tails in said second autoclave with that amount of fresh sodium carbonate substantially theoretically equivalent to the $K_2O$ in the fresh Wyomingite treated in said first autoclave, separating the exhausted tails from the solution from said second autoclave and passing the solution to the first autoclave after adding sufficient sodium carbonate that the solution from the first autoclave has a weight ratio of $Na_2CO_3:K_2CO_3$ of about 0.51:1, evaporating the solution from said first autoclave to crystallize sodium carbonate and then sodium potassium carbonate and separating them, cooling the final solution to crystallize potassium carbonate, and returning the crystallized sodium potassium carbonate to said first autoclave.

4. That method of extracting potash from Wyomingite comprising treating only all of the fresh Wyomingite in a first autoclave under steam pressure with solution from a second autoclave, separating the partly exhausted tails from the solution from said first autoclave, treating said tails in said second autoclave with that amount of a sodium salt substantially theoretically equivalent to the potash in the fresh Wyomingite treated in said first autoclave, separating the exhausted tails from the solution from said second autoclave and passing the solution to the first autoclave and recovering potassium salt from the solution from said first autoclave.

5. That method of extracting potash from Wyomingite comprising treating only all of the Wyomingite in a first autoclave with solution from a second autoclave to partially extract potash from the Wyomingite, separating the resultant solution from the partly exhausted tails, treating the tails in said second autoclave with that amount of fresh sodium carbonate substantially theoretically equivalent to the available potash of the fresh Wyomingite treated in said first autoclave, separating the exhausted tails from the solution produced in said second autoclave and passing the solution to said first autoclave, concentrating the solution from said first autoclave to crystallize sodium carbonate and then sodium potassium carbonate, separating said crystallized carbonates from the mother liquor and adding them to the first autoclave, cooling said mother liquor to crystallize potassium carbonate, separating said potassium carbonate from mother liquor, and returning the potassium carbonate mother liquor to the concentrating system.

6. That method of extracting potash from Wyomingite comprising treating only all of the Wyomingite in a first autoclave with solution from another autoclave to partially extract potash from the Wyomingite, separating the resulting solution from the partly exhausted tails, treating the tails in said other autoclave with that amount of fresh sodium carbonate substantially theoretically equivalent to the available potash of the fresh Wyomingite treated in the said first autoclave, separating the exhausted tails from the solution produced in said other autoclave and passing the solution to said first autoclave, concentrating the solution from the said first autoclave to crystallize carbonates, separating said carbonates and passing sufficient of them to the said first autoclave to provide a sufficient surplus of sodium carbonate to effect the extraction of potash desired in the said first autoclave, cooling the mother liquor remaining after the crystallization of the said carbonates to crystallize potassium carbonate, separating the said potassium carbonate from mother liquor and returning the latter to the concentrating system.

7. That method of extracting potash from Wyomingite by base exchange with sodium carbonate comprising treating only all of the fresh Wyomingite in a first autoclave under steam pressure with a solution from a second autoclave, separating the partly exhausted tails from the solution from said first autoclave, feeding said tails in said second autoclave with the entire amount of sodium carbonate necessary to effect extraction of substantially all of the exchangeable potash carried by said Wyomingite, separating the exhausted tails from the solution from said second autoclave and passing the solution to the first autoclave, evaporating the end solution from the said first autoclave to crystallize out sodium carbonate and sodium potassium carbonate, recovering potassium carbonate from the final mother liquor, and adding all of the sodium potassium carbonate to the said first autoclave and maintaining therein that ratio of

in the end liquor necessary to effect the desired partial extraction of K₂O.

8. That method of extracting potash from Wyomingite comprising treating only all of the fresh Wyomingite in a first autoclave with solution from a second autoclave, separating tails from the solution from said first autoclave, treating said tails in said second autoclave with an amount of fresh sodium carbonate at least substantially sufficient to complete extraction of the potash in the tails in said second autoclave, separating tails from the solution from said second autoclave and passing the solution to the first autoclave, crystallizing and separating from the solution from said first autoclave sodium carbonate, and producing a mother liquor containing potassium carbonate, and adding sodium carbonate to the system in an amount such that the solution from said first autoclave contains not more than about 0.5 pound of sodium carbonate per pound of potassium carbonate.

9. A cyclic method of extracting potash from Wyomingite comprising treating only all of the fresh Wyomingite in a first autoclave with solution from a second autoclave to partially extract potash from the Wyomingite, separating the resultant solution from the tails, treating said tails in a second autoclave with at least that amount of sodium carbonate necessary to complete extraction of the available potash in the said tails, separating the tails from the solution produced in said second autoclave and passing said solution to said first autoclave, concentrating the solution from said first autoclave to crystallize sodium carbonate and then sodium potassium carbonate and produce a mother liquor, cooling said mother liquor to crystallize potassium carbonate, separating said potassium carbonate from mother liquor, returning the potassium carbonate mother liquor to the system, and adding sodium carbonate to the system in an amount such that the solution from said first autoclave has a Na₂CO₃:K₂CO₃ ratio by weight of not more than about 0.51 to 1.0.

10. That method of extracting potash from Wyomingite by treatment in a series of autoclaves comprising treating only all of the fresh Wyomingite in the first autoclave of the series under steam pressure with solution recycled through the autoclaves from the last in the series, separating the partly exhausted tails from the solution from said first autoclave and passing said tails in series to the last autoclave for treatment with said recycled solution, treating the said tails in the last autoclave of the series with at least that amount of a sodium salt substantially theoretically equivalent to the potash in the fresh Wyomingite treated in said first autoclave of the series, whereby substantially all of the exchangeable potash is removed from said tails, removing the exhausted tails from said last autoclave, and recovering potassium salts from the solution from the said first autoclave.

11. A method according to claim 10, said sodium salt being sodium carbonate, and the potassium salt recovered being potassium carbonate.

ROBERT D. PIKE.

REFERENCES CITED

The following references are of record in the file of this patent:

UNITED STATES PATENTS

| Number | Name | Date |
|---|---|---|
| Re. 18,393 | Pike et al. | Mar. 22, 1932 |
| 1,296,035 | Andrews | Mar. 4, 1919 |
| 1,443,674 | Blanc | Jan. 30, 1923 |
| 2,343,080 | Pike | Feb. 29, 1944 |
| 2,343,081 | Pike | Feb. 29, 1944 |